United States Patent [19]

Herbert

[11] Patent Number: 4,693,855
[45] Date of Patent: Sep. 15, 1987

[54] METHOD FOR REDUCING WASTAGE IN A MULTIPLE-HEAD EXTRUSION DEVICE

[75] Inventor: Adolf Herbert, Hanover, Fed. Rep. of Germany

[73] Assignee: Hermann Berstorff Maschinenbau GmbH, Hanover, Fed. Rep. of Germany

[21] Appl. No.: 906,289

[22] Filed: Sep. 11, 1986

[30] Foreign Application Priority Data

Sep. 30, 1985 [DE] Fed. Rep. of Germany ....... 3534770

[51] Int. Cl.⁴ .............................................. B29C 47/92
[52] U.S. Cl. .................................. 264/40.7; 264/171; 425/131.1; 425/146
[58] Field of Search ...................... 366/76, 79; 222/55; 425/136, 142, 141, 145, 149, 166, 130, 131.1, 131.5, 132, 133.1, 133.5, 376 R; 264/40.1, 40.3, 40.4, 40.7, 171–174, 349

[56]  References Cited

U.S. PATENT DOCUMENTS

| | | | |
|---|---|---|---|
| 3,464,087 | 9/1969 | Koch | 425/133.5 |
| 3,628,561 | 12/1971 | Corbett | 425/149 |
| 4,171,193 | 10/1979 | Rahlfs | 425/145 |
| 4,307,760 | 12/1981 | Häuser | 222/55 |
| 4,403,934 | 9/1983 | Rasmussen et al. | 425/133.1 |
| 4,431,598 | 2/1984 | Korpman | 264/40.7 |
| 4,498,783 | 2/1985 | Rudolph | 222/55 |
| 4,548,568 | 10/1985 | Herbert et al. | 425/131.1 |

Primary Examiner—Jay H. Woo
Assistant Examiner—J. Fortenberry
Attorney, Agent, or Firm—Schwartz, Jeffery, Schwaab, Mack, Blumenthal & Evans

[57]  ABSTRACT

A method of reducing wastage during the start-up phase of an extrusion device used to produce extruded profiles such as tread strips for vehicle tires from a plurality of mixtures is disclosed. The extrusion device comprises a plurality of extruders each extruding a component of the profile and each extruder has its own drive means. The outlets from the extruders communicate with a template member having flow channels formed therein which lead into a common extrusion port. The drive means are actuated simultaneously and the pressure of each of the components is monitored in the outlet region of each extruder. These pressures are compared with a pre-determined desired pressure by a control device, which device switches-off the appropriate drive means as each desired pressure is attained. When all desired pressures have been attained, all of the drive means are re-actuated simultaneously by the control device. In a minor modification of the method, the drive means for the final extruder to reach its desired pressure is not switched-off and the other drive means are simultaneously re-actuated when the final desired pressure is attained.

2 Claims, 2 Drawing Figures

METHOD FOR REDUCING WASTAGE IN A MULTIPLE-HEAD EXTRUSION DEVICE

FIELD OF THE INVENTION

The invention relates to a method and apparatus for reducing wastage in a multiple-head extrusion device. More particularly, the present invention relates to a method and apparatus for reducing wastage in an extrusion device which is used for producing extruded profiles from different mixtures to form, for example, the tread strips or lateral strips of tyres for automotive vehicles.

BACKGROUND OF THE INVENTION AND PRIOR ART DISCUSSION

Extrusion devices having multiple heads are known. In such a device, two or more extruders are disposed adjacent one another, each device having its own drive means. The outlets from the extrusion device communicate with a front template defining flow channels which converge towards one another. These flow channels lead to a common discharge orifice. Such a device is disclosed in German Offenlegungsschrift No. 3 238 284. In such a device, the extruders have differing throughput capacities. Accordingly the rubber or plastics material mixtures issuing from the individual extruders may emerge from the common nozzle at different times, particularly when the extrusion device is initially started. A considerable amount of material is thus conveyed through the head until all of the mixtures being used to form the profile being extruded, emerge from the multiple extrusion head in their full volume. The material extruded until this occurs constitutes waste material which is only re-usable to a very limited extent.

An additional complication resides in the fact that it is frequently necessary to change one or more of the component mixtures during each working shift. Thus, it is not an uncommon occurrence for such a change to be effected eight to ten times. This means that a large amount of waste material is produced each time the extrusion device is restarted.

An apparatus for producing extruded profiles from different rubber or plastics material mixtures is disclosed in German Offenlegungsschrift No. 3 333 105. In such apparatus, the extruders are disposed one above the other and operate with a common extrusion head.

To prevent damage being sustained by the thin projection members forming part of the front templates disposed in the multiple head, the actuating of the drive motors of the individual extrusion devices is effected in mutual dependence upon one another and/or in a timed sequence. Such an apparatus prevents the projection member of the front templates from being bent as a result of the high pressures produced in the multiple head.

By actuating the individual drive motors successively and/or by actuating them in an inter-dependent manner, however, an extremely large amount of waste material is produced. This is because, initially, the extrusion device operating at the lower pressure is actuated first and only after a pre-selected length of time is the extrusion device operating at the higher pressure subsequently actuated.

It is also open to question as to whether such an arrangement prevents the projection members of the front templates from becoming damaged. In any event, an unacceptably high level of waste material is extruded and the need to change, for example, the principal mixture for a tread surface of the tread strip of a vechicle tyre eight to ten times during one working shift is not viable.

OBJECTS OF THE INVENTION

The present invention seeks to overcome the above-described disadvantages. In particular, the present invention seeks to provide a method and apparatus whereby the amount of waste material extruded in a multiple head extrusion device immediately after the start-up of the device is substantially reduced.

BRIEF SUMMARY OF THE INVENTION

According to the present invention, there is provided a method of reducing the wastage during the start-up phase of an extrusion device used to produce extruded profiles from a plurality of mixtures, each component of the finished profile being extruded from a separate extruder and drive means being provided for each extruder, the extruders being disposed adjacent one another and the outlet from each extruder communicating with a template member having flow channels formed therein, which flow channels converge towards one another and lead into a common extrusion port wherein the drive motors for all of the extruders are actuated simultaneously, the pressure of the material at the outlet of each extruder or at the inlet of the flow channel in the template member associated therewith is monitored and compared with a pre-determined value, switching off the drive means for each extruder when said pre-determined value is attained and re-actuating all of the drive means simultaneously when all of the pre-determined pressure values have been attained. In a modification of this method, the drive means for the final extruder to reach its predetermined pressure is not switched-off but continues to operate and the remaining drive means are re-actuated simultaneously when the final extruder attains its predetermined pressure. By monitoring the material pressure in the outlet region of each extrusion device, either directly at the outlet or at the inlet into the flow channels in the extrusion head, and by switching off the drive motors for each extruder upon attainment of a pre-selected pressure (except, possibly, the final extruder to reach such a pressure), the barrel of each extruder and the flow channels in the extruder head are completely filled with material.

When all of the drive means for the extruders are re-actuated, the material from the barrels thereof are simultaneously conveyed into the channels of the front template. Accordingly, a profile emerges from the extrusion orifice or bar which is substantially full volume and which contains the desired proportions of each mixture. As a result, there is only a minimal wastage of material.

Also according to the present invention, there is provided an apparatus when used for carrying out the method of the present invention, the apparatus comprising a plurality of extruders disposed adjacent one another, each extruder having an outlet communicating with a common extrusion aperture, drive means for each extruder, pressure sensor means disposed in the outlet region of each extruder and a control device communicating with each of the pressure sensor means and with each individual drive means for the extruders.

Still further according to the present invention, there is provided an apparatus for reducing wastage during the start-up phase of a multiple-head extrusion device comprising a plurality of extruders, separate drive means for each extruder, pressure sensor devices disposed in the outlet region of each extruder for indicating the pressure of material extruded from the extruder, and a control device communicating with each sensor device and with each drive means, the control device including means for comparing the pressure indicated by each sensor with a pre-determined desired pressure, means for switching off the drive means for each extruder when the pressure of the extruded material attains the pre-determined pressure and means for re-actuating each switched-off drive means when all of the desired pressures have been attained.

BRIEF DESCRIPTION OF THE DRAWINGS

One embodiment of an apparatus in accordance with the present invention and which can be used for implementing a method according to the present invention will be further described, by way of example, with reference to the accompanying drawings, in which.

DESCRIPTION OF PREFERRED EMBODIMENT

Figure 1:
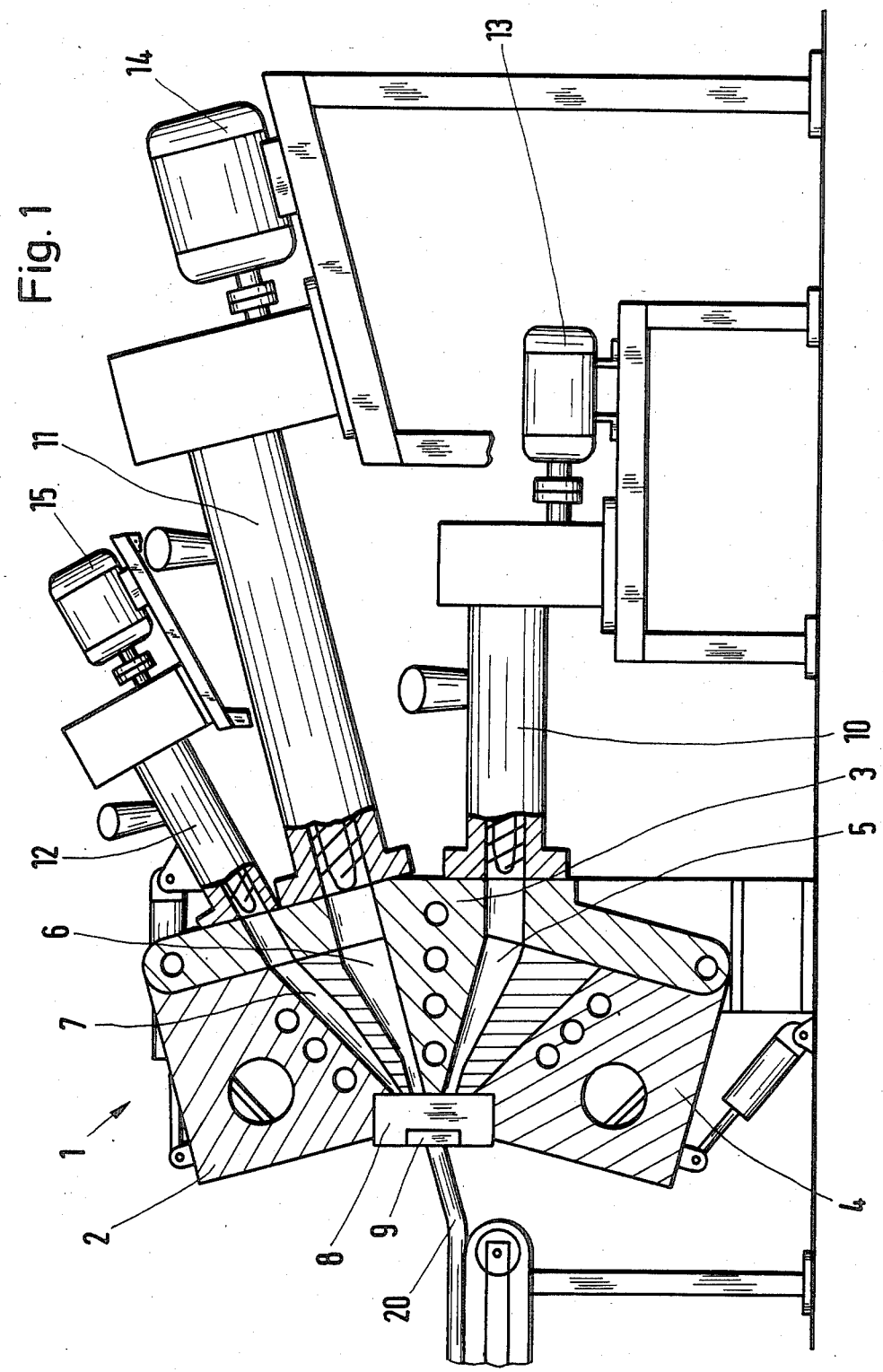
FIG. 1 is a longitudinal sectional view through an extrusion device having a multiple head fed by a plurality of extruders.

In FIG. 1 there is shown an extrusion device which comprises a multiple extrusion head 1. The head 1 comprises a fixed or stationary central portion 3 and the pivotable or hingeable upper and lower portion 2 and 4 respectively. Flow channels 5, 6 and 7 are formed in the head 1 and extend into a front template 8 and thereafter into the extrusion bar or channel 9.

The head is fed by separate extruders 10, 11 and 12 which have their own individual drive motors 13, 14 and 15 respectively associated therewith. The extruders 10, 11, 12 extrude material into the flow channels 5,6 and 7 respectively.

Figure 2:
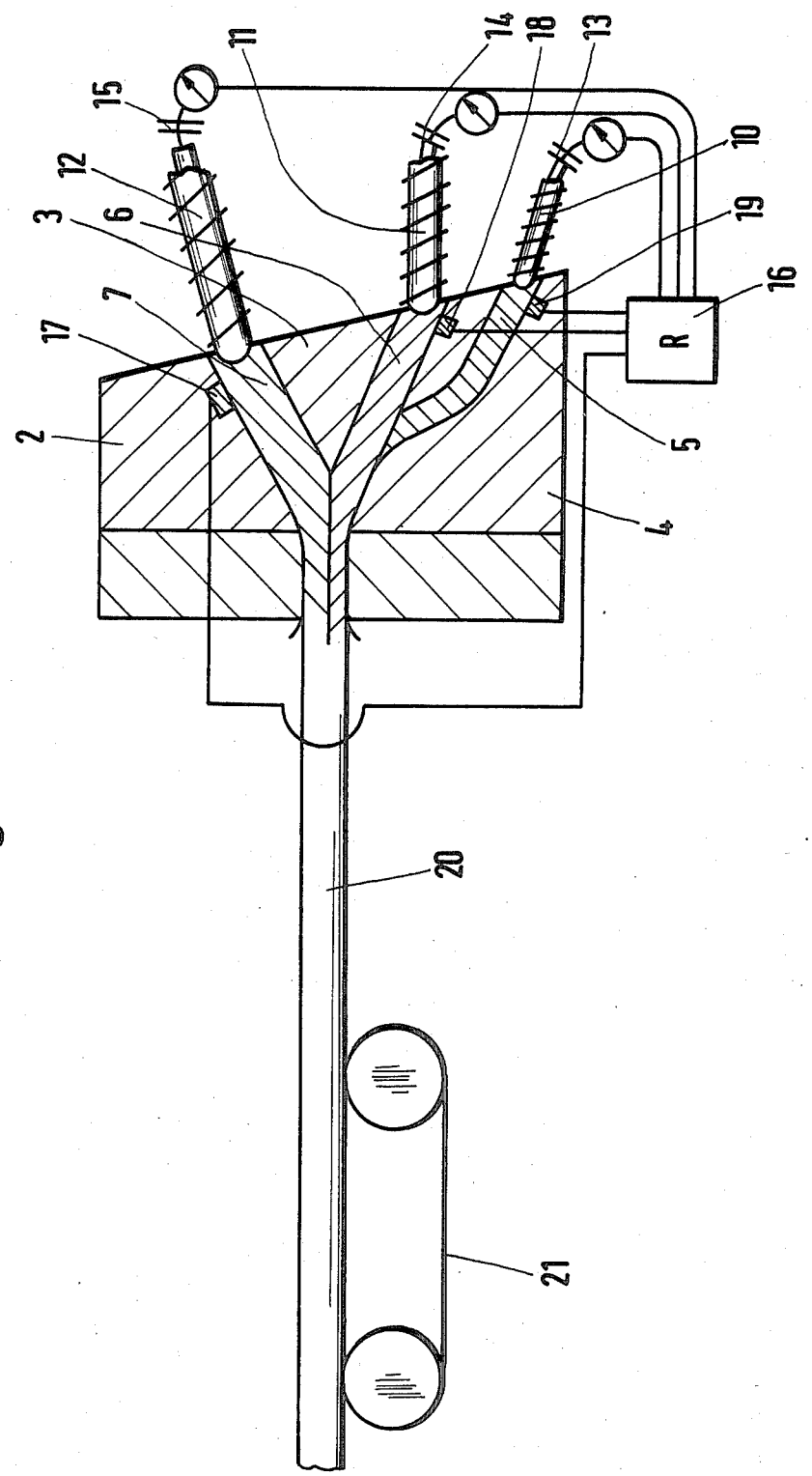
FIG. 2 is a schematic, longitudinal sectional view showing a control device for the extrusion device shown in FIG. 1.

FIG. 2 shows a commercially available control device 16 which is connected by appropriate wiring to pressure sensors 17, 18 and 19 disposed at the inlets into the flow channel 7, 8 and 9 respectively. These sensors 17, 18 and 19 could, if desired, be disposed at the outlet of the respective extruder with which the flow channels 7, 8 or 9 are associated. In addition, the control device 16 is connected to each of the drive motors 13, 14 and 15 for the extrusion devices 10, 11 and 12.

The manner of operation of the apparatus will now be described.

The drive motors 13, 14 and 15 are actuated simultaneously and the actual pressures of each of the components of the mixture at the inlet into the flow channels or at the outlet of the extruder are monitored by the pressure sensors 17, 18 and 19. These pressures are compared with pre-determined desired pressures by means of the control device 16.

Once the predetermined desired pressure value is ascertained by one of the sensors 17, 18, 19, the control device 16 causes the drive motor for the extruder delivering the component at the correct pressure to be switched off. Thus, if the sensor 19 detects that the extruder 10 is delivering material at the desired pressure, the drive motor 13 for the extruder 10 is switched off. The other drive motors continue to operate until the extruders associated therewith are also delivering their respective components at the predetermined pressures.

Once all of the desired pressures have been indicated by the pressure sensors 17, 18 and 19, all of the drive motors 13, 14 and 15 are simultaneously re-actuated.

The extruders 10, 11 and 12 then uniformly convey material into the associated flow channels 5, 6 and 7. The material pick-up volume of the flow channels is adapted in dependence upon the throughput of the individual extruders.

The desired extruded profile 20 formed, in the embodiment shown, from three different rubber mixtures, then emerges from the extrusion channel bar 9 and is collected by a conveyor belt 21.

It has been found that, by using the apparatus of the present invention, after the extrusion of a profile length of approximately 1 m, the desired extruded profile emerges from the head 1. Accordingly, only a minimal amount of material is lost or wasted.

I claim:

1. A method of reducing the wastage during the start-up phase of an extrusion device used to produce extruded profiles from a plurality of mixtures, said extrusion device comprising a plurality of extruders, each said extruder extruding a different one of said mixtures and comprising an inlet end region and an outlet end region disposed remote from said inlet end region, separate drive means driving each said extruder, pressure sensor means disposed in said outlet end region of each said extruder for measuring the pressure of said mixture emerging from said extruder, a template member defining flow channels for receiving the individual outputs from said extruders, a common extrusion port fed by said flow channels and control mens operatively connected to each said pressure sensor means and to each said drive means, said control means including comparator means for comparing said measured pressures with pre-determined desired pressures, and means for actuating and de-actuating each said drive means in dependence upon said measured pressures, said method comprising the steps of
    (a) actuating all of said drive means simultaneously to cause each said extruder to commence extruding a different one of said mixtures,
    (b) monitoring the pressure of each mixture being extruded utilising said pressure sensor means,
    (c) comparing each said measured pressure with said pre-determined desired pressures utilising said comparator means, said control device causing de-actuation of said drive means for each said extruder when the pressure of material extruded by said extruder is equal to said predetermined desired pressure, and
    (d) re-actuating all said drive means when all of said pre-determined desired pressures have been attained.

2. A method of reducing the wastage during the start-up phase of an extrusion device used to produce extruded profiles from a plurality of mixtures, said extrusion device comprising a plurality of extruders, each said extruder extruding a different one of said mixtures and comprising an inlet end region and an outlet end region disposed remote from said inlet end region, separate drive means driving each said extruder, pressure sensor means disposed in said outlet end region of each said extruder for measuring the pressure of said mixture emerging from said extruder, a template member defining flow channels therein for receiving the individual outputs from said extruders, a common extrusion port fed by said flow channels and control means operatively connected to each said pressure sensor means and to each said drive means, said control means including comparator means for comparing said measured pressures with pre-determined desired pressures and means for actuating and de-actuating each said drive means in dependence upon said measured pressures, said method comprising the steps of (a) actuating all of said drive means simultaneously to cause each said extruder to commence extruding a different one of said mixtures,
  (b) monitoring the pressure of each mixture being extruded utilising said pressure sensor means,
  (c) comparing each said measured pressure with said pre-determined desired pressure utilising said comparator means, said control means causing de-actuation of each said drive means as each said desired pressure is attained until a single drive means remains actuated, and
  (d) continuing the actuation of said single drive means until said desired pressure is attained and simultaneous re-actuating all of said other drive means.

* * * * *